(12) United States Patent
Payne et al.

(10) Patent No.: US 9,897,184 B2
(45) Date of Patent: Feb. 20, 2018

(54) STATOR CONE CLUTCH

(71) Applicant: Schaeffler Technologies AG & Co. KG, Herzogenaurach (DE)

(72) Inventors: Matthew Payne, Glenmont, OH (US); Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/152,327

(22) Filed: May 11, 2016

(65) Prior Publication Data

US 2016/0319924 A1 Nov. 3, 2016

Related U.S. Application Data

(63) Continuation-in-part of application No. 14/811,082, filed on Jul. 28, 2015.

(60) Provisional application No. 62/076,986, filed on Nov. 7, 2014.

(51) Int. Cl.
| | |
|---|---|
| F16D 25/0632 | (2006.01) |
| F16H 45/00 | (2006.01) |
| F16H 41/24 | (2006.01) |
| F16H 45/02 | (2006.01) |
| F16D 13/26 | (2006.01) |

(52) U.S. Cl.
CPC ............ *F16H 41/24* (2013.01); *F16D 13/26* (2013.01); *F16D 25/0632* (2013.01); *F16H 45/02* (2013.01); *F16H 2041/246* (2013.01); *F16H 2045/0205* (2013.01); *F16H 2045/0231* (2013.01); *F16H 2045/0278* (2013.01); *F16H 2045/0294* (2013.01)

(58) Field of Classification Search
CPC .................................................. F16D 25/0632
See application file for complete search history.

(56) References Cited

U.S. PATENT DOCUMENTS

| | | | | |
|---|---|---|---|---|
| 3,724,208 | A * | 4/1973 | Welch | ..................... F16H 61/58 60/343 |
| 5,729,976 | A | 3/1998 | Murata et al. | |
| 8,960,394 | B2 | 2/2015 | Carrier | |

(Continued)

FOREIGN PATENT DOCUMENTS

WO 2014098353 6/2014

OTHER PUBLICATIONS

International Search Report and Opinion for PCT/US2015/042444; 12 pgs; dated Oct. 16, 2015 by Korean Intellectual Property Office.

*Primary Examiner* — Robert A Siconolfi
*Assistant Examiner* — Ryan Dodd

(57) ABSTRACT

A stator for a torque converter includes a body portion with a first frusto-conical surface, a flange including a second frusto-conical surface, a stator clutch including the first and second frusto-conical surfaces, and at least one clutch plate disposed therebetween. In some example embodiments, the at least one clutch plate comprises a pair of frusto-conical surfaces. In an example embodiment, at least one of the at least one clutch plate frusto-conical surfaces includes a friction material bonded thereto. In an example embodiment, the body portion or the flange includes a first drive tab and the at least one clutch plate includes a second drive tab drivingly engaged with the first drive tab.

19 Claims, 13 Drawing Sheets

(56) References Cited

U.S. PATENT DOCUMENTS

| | | |
|---|---|---|
| 2004/0118113 A1 | 6/2004 | Fukunaga et al. |
| 2007/0045077 A1* | 3/2007 | Choi .................. F16D 25/0632 192/85.22 |
| 2010/0230225 A1 | 9/2010 | Yamashita et al. |
| 2013/0056319 A1 | 3/2013 | Lindemann et al. |

* cited by examiner

STATOR CONE CLUTCH

TECHNICAL FIELD

The present invention relates generally to a torque converter, and, more specifically to a torque converter with a stator with a cone clutch and a bearing to transmit thrust force from the stator to an impeller shell.

BACKGROUND

Patent Application No. WO 2014/098353 (Kwon) discloses a typical cone clutch for a stator in a torque converter. In a typical torque converter using a stator with a cone clutch, during stator locked mode, the cone clutch is closed to non-rotatably connect the stator to a stator shaft and axial thrust generated by fluid passing through the blades of the stator is reacted by the stator and stator shaft. Since the stator shaft is fixed to the transmission, the thrust is undesirably transmitted to the transmission. In addition, the axial force flow between the torque converter's turbine and impeller is not closed, which causes the impeller to thrust against a flex plate used to connect the torque converter to an engine crankshaft. Further, the design shown by Kwon requires a complicated assembly to slip the snap ring over the stator shaft and into its groove during installation into the transmission.

SUMMARY

Example embodiments broadly comprise a stator for a torque converter including a body portion including a first frusto-conical surface, a flange including a second frusto-conical surface, a stator clutch including the first and second frusto-conical surfaces and at least one clutch plate disposed therebetween. In some example embodiments, the at least one clutch plate comprises a pair of frusto-conical surfaces. In an example embodiment, at least one of the at least one clutch plate frusto-conical surfaces includes a friction material bonded thereto. In an example embodiment, the body portion or the flange includes a first drive tab and the at least one clutch plate includes a second drive tab drivingly engaged with the first drive tab.

In some example embodiments, the at least one clutch plate comprises two clutch plates, the body portion and the flange each comprises respective drive tabs, one of the clutch plates includes a first drive tab drivingly engaged with the body portion drive tab, and the other of the clutch plates includes a second drive tab drivingly engaged with the flange drive tab. In some example embodiments, the body portion has a radial wall and the other of the clutch plates includes an integral spring portion contacting the body portion radial wall. In an example embodiment, the flange has a radial wall and the second drive tab is in contact with the flange radial wall.

In an example embodiment, the body portion and the flange comprise respective circumferential surfaces in contact with one another. In some example embodiments, the body portion or the flange comprises a circumferential protrusion for radially positioning a bearing. In an example embodiment, the stator includes the bearing. In an example embodiment, the flange has a spline for driving engagement with a transmission stator shaft. In an example embodiment, the body portion has at least one stator blade.

Other example embodiments broadly comprise a torque converter including a cover, an impeller, a turbine, a stator cone clutch, and a thrust bearing. The cover is arranged to receive torque. The impeller includes an impeller shell non-rotatably connected to the cover. The turbine is in fluid communication with the impeller and includes a turbine shell. The stator is at least partially located between the impeller and the turbine and includes a body portion with at least one stator blade and a first frusto-conical surface. The stator cone clutch includes the first frusto-conical surface, a flange with a second frusto-conical surface, and at least one clutch plate disposed between the first and second frusto-conical surfaces. The thrust bearing is axially disposed between the stator cone clutch and the impeller shell. In a stator locked mode, the body portion, the clutch plate, and the flange are non-rotatably connected; and the stator cone clutch is arranged to urge the first thrust bearing against the impeller shell in a first axial direction.

In an example embodiment, a line, orthogonal to an axis of rotation for the torque converter, passes through the first and second frusto-conical surfaces and forms respective acute angles with respect to the first and second frusto-conical surfaces. In an example embodiment, in the stator locked mode, fluid circulating through the impeller and the turbine is arranged to generate a first force urging the body portion in the first axial direction to non-rotatably connect the body portion and the flange, and, in a stator free-wheel mode, the fluid circulating through the impeller and the turbine is arranged to generate a second force, in a second axial direction opposite the first axial direction, urging the body portion in the second axial direction to enable rotation between the body portion and the flange. In an example embodiment, the torque converter has friction material disposed between the body portion and the flange and fixed to one of the body portion, the at least one clutch plate, or the flange. In the stator locked mode, the body portion, the friction material, and the flange are non-rotatably connected.

In some example embodiments, the torque converter has a second thrust bearing located between the turbine shell and the stator cone clutch in the first axial direction. For the stator locked mode, the second thrust bearing is arranged to transmit thrust from the turbine shell to the stator cone clutch to non-rotatably connect the body portion and the flange. In an example embodiment, the second thrust bearing is directly engaged with the flange, and, in the stator locked mode, is arranged to transmit the thrust from the turbine shell to the flange to displace the flange in the first axial direction. The first thrust bearing is directly engaged with the body portion. In an example embodiment, the second thrust bearing is directly engaged with the body portion, and, in the stator locked mode, is arranged to transmit the thrust from the turbine shell to the body portion to displace the body portion in the first axial direction. The first thrust bearing is directly engaged with the body portion. In an example embodiment, the at least one clutch plate comprises two clutch plates. One of the clutch plates includes a radially outer-most distal end non-rotatably connected to the body portion. The other of the clutch plates includes a radially inner-most distal end non-rotatably connected to the flange.

BRIEF DESCRIPTION OF THE DRAWINGS

Various embodiments are disclosed, by way of example only, with reference to the accompanying schematic drawings in which corresponding reference characters indicate corresponding parts, in which.

DETAILED DESCRIPTION

Figure 1:
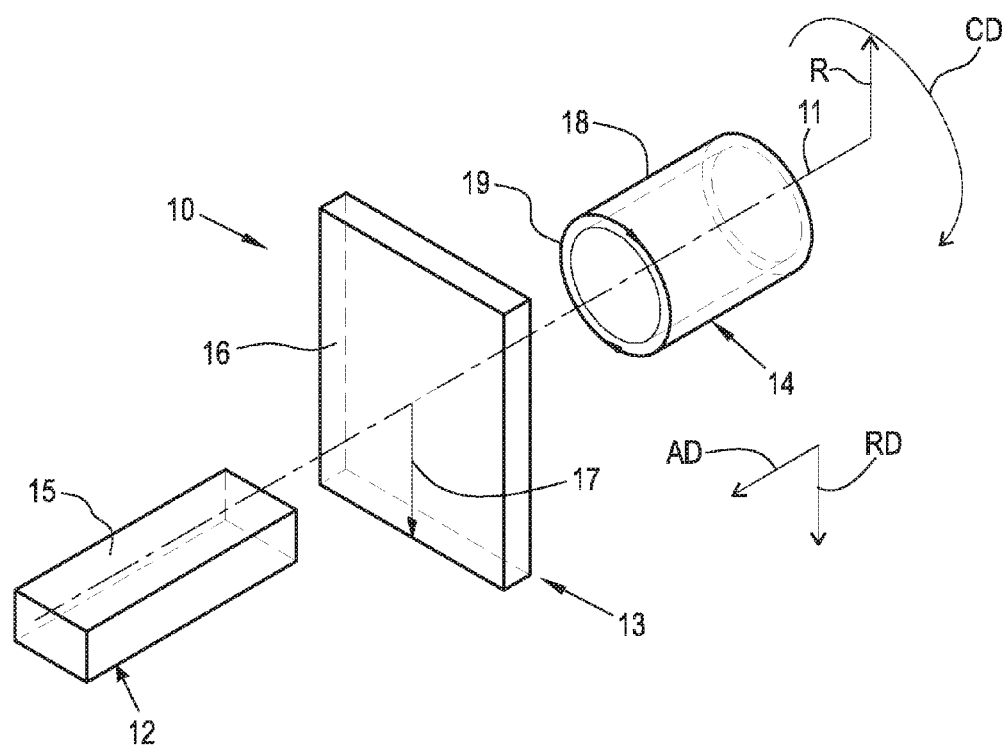
FIG. 1 is a perspective view of a cylindrical coordinate system demonstrating spatial terminology.

At the outset, it should be appreciated that like reference characters on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention. The assembly of the present invention could be driven by hydraulics, electronics, and/or pneumatics.

By "non-rotatably connected" first and second components we mean that the first component is connected to the second component so that any time the first component rotates, the second component rotates with the first component, and any time the second component rotates, the first component rotates with the second component. Axial displacement between the first and second components is possible. Relative rotation between the first and second components is possible.

FIG. 1 is a perspective view of cylindrical coordinate system 10 demonstrating spatial terminology used in the present invention. The present invention is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
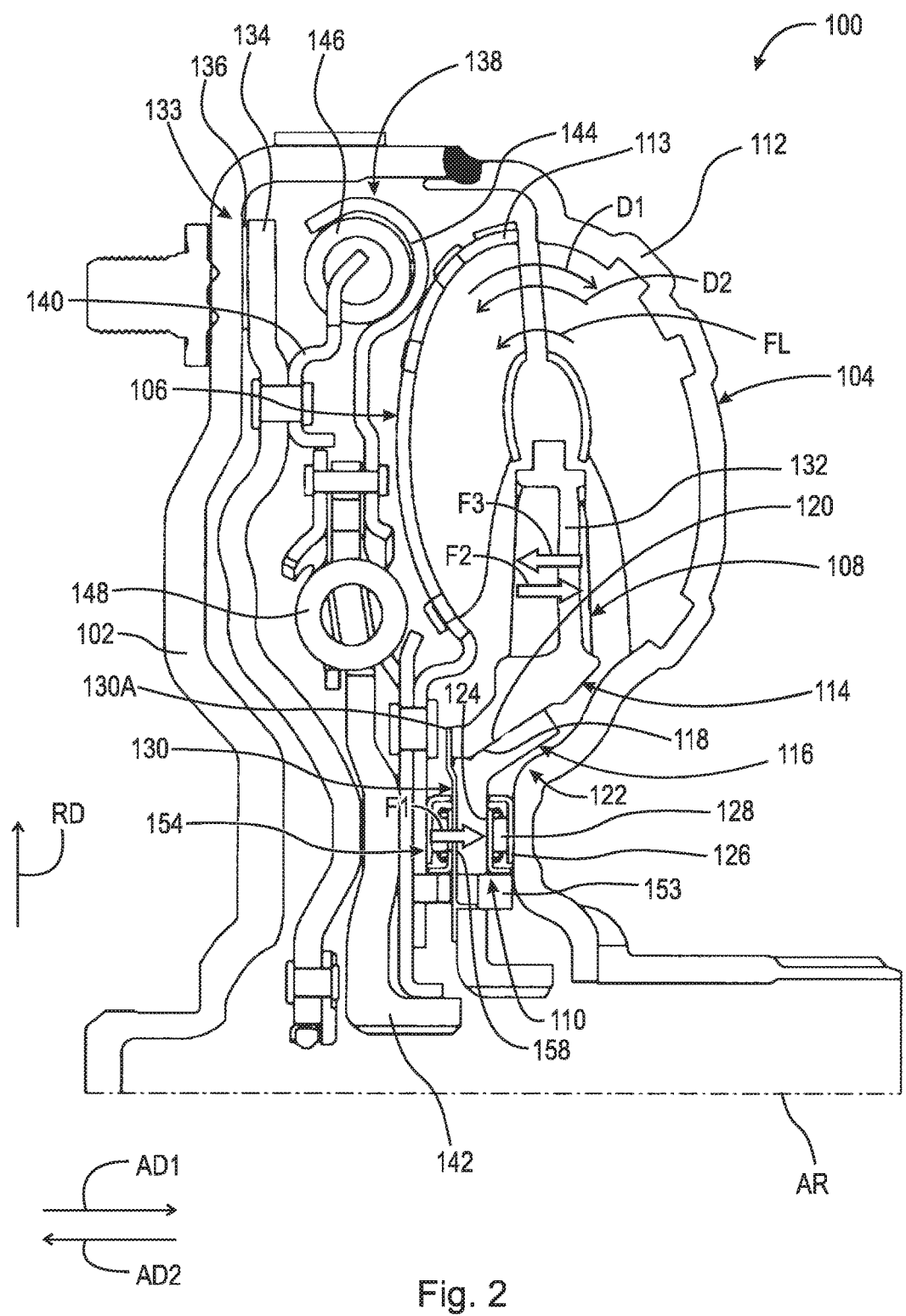
FIG. 2 is a partial cross-sectional view of a torque converter including a stator with a stator cone clutch.

FIG. 2 is a partial cross-sectional view of torque converter 100 including a stator with a cone clutch.

Figure 3:
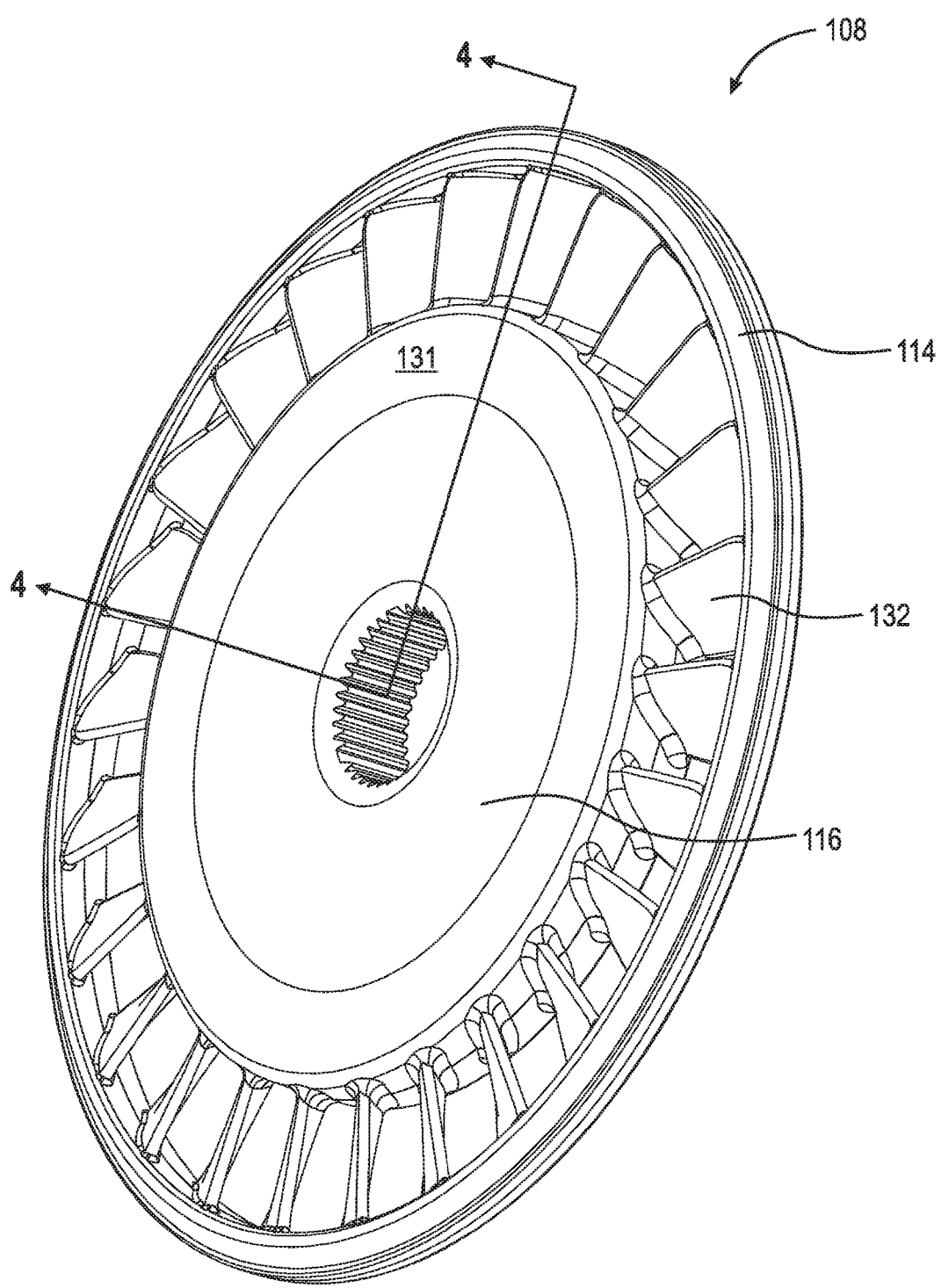
FIG. 3 is a perspective view of the stator shown in FIG. 2.

FIG. 3 is a perspective view of the stator shown in FIG. 2.

Figure 4:
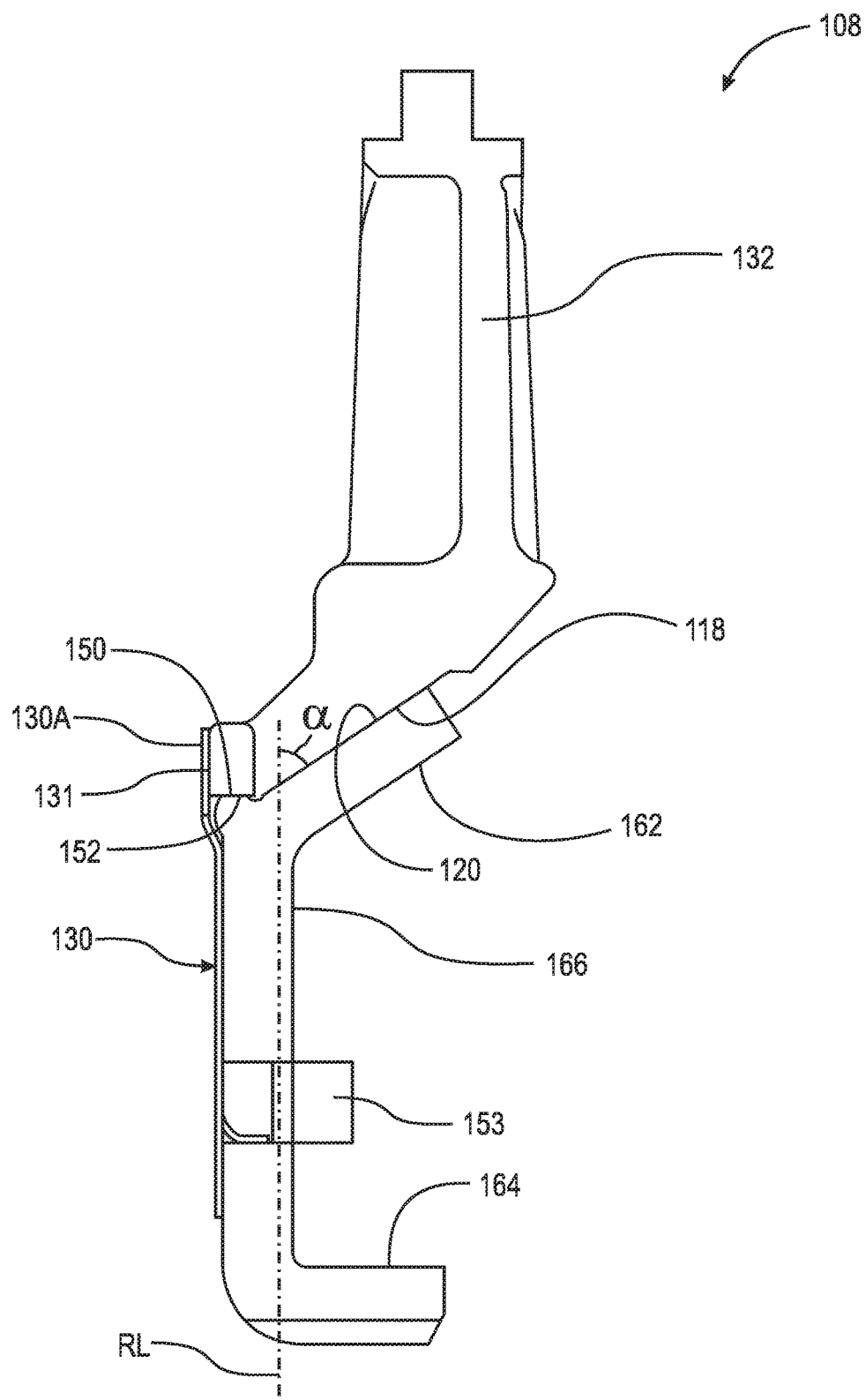
FIG. 4 is a partial cross-sectional view generally along line 4-4 in FIG. 3.

FIG. 4 is a partial cross-section view generally along line 4-4 in FIG. 3. The following should be viewed in light of FIGS. 2 through 4. Torque converter 100 includes: cover 102, impeller 104, turbine 106, stator 108, and thrust bearing 110. Cover 102 is arranged to receive torque from a vehicle's engine (not shown). Impeller 104 includes impeller shell 112 non-rotatably connected to cover 102 and turbine 106 includes turbine shell 113. Turbine 106 is in fluid communication with impeller 104. Stator 108 is at least partially located between impeller 104 and turbine 106 in axial direction AD1 and includes body portion 114 and flange 116. Bearing 110 is directly engaged with flange 116 and shell 112. By two components "directly engaged" we mean that the two components are in direct contact or a separated by a nominal third component, such as a washer. For example, a thrust force from flange 116 is directly transmitted to bearing 110 and bearing 110 directly transmits the force to shell 112.

Figure 5:
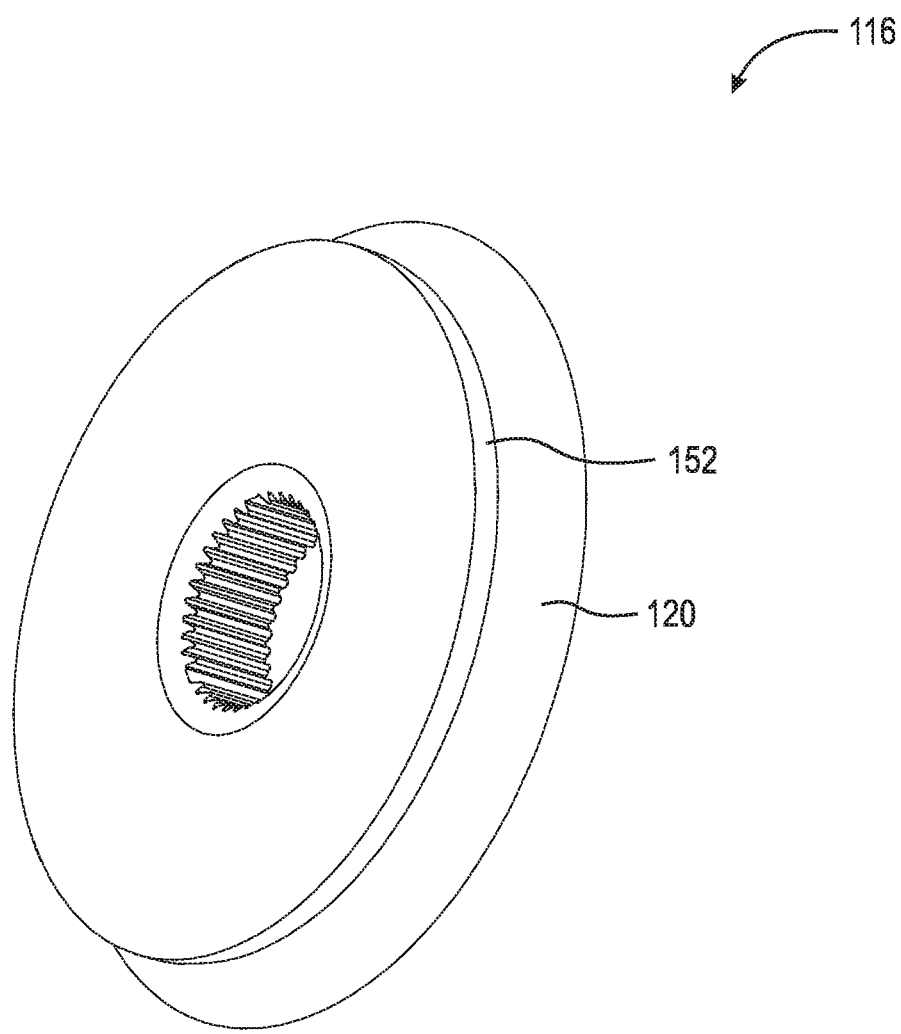
FIG. 5 is a perspective front view of the flange shown in FIG. 2.

FIG. 5 is a perspective front view of flange 116 shown in FIG. 2.

Figure 6:
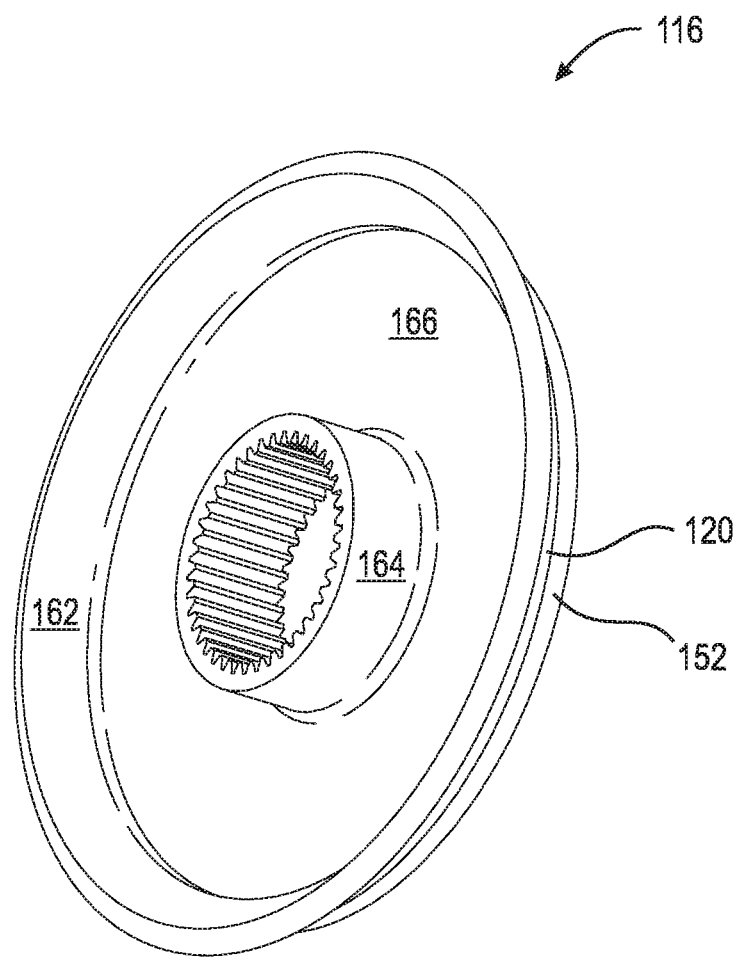
FIG. 6 is a perspective rear view of the flange shown in FIG. 2.

FIG. 6 is a perspective rear view of flange 116 shown in FIG. 2. The following should be viewed in light of FIGS. 2 through 6. Body portion 114 and flange 116 include frusto-conical surfaces 118 and 120, respectively. Stator 108 includes stator cone clutch 122, which includes surface 118 and flange 116. Bearing 110 is disposed between flange 116 and impeller shell 112 in direction AD1 and includes races 124 and 126. By frusto-conical, we mean having the shape of a frustum of a cone. By frustum we mean the part of a conical shape left after cutting off a top portion of the shape with a plane parallel to the base of the shape.

In a stator locked mode for torque converter 100 (further discussed below): stator 108 is rotationally locked; clutch 122 is closed so that surfaces 118 and 120 are frictionally engaged and flange 116 is non-rotatably connected to body portion 114; and flange 116 receives thrust force F1 in direction AD1. In response to force F1, flange 116 urges bearing 110 against shell 112 and transmits force F1 through thrust bearing 110 to shell 112. In an example embodiment, race 124 is proximate flange 116 and race 126 is proximate shell 112. As is known in the art, at least one rolling element 128 enables rotation between races 124 and 126. By "non-rotatably connected" components, we mean that the components are fixed to each other with respect to rotation, that is, whenever one of the components rotates, the rest of the components rotate. Axial displacement is possible between non-rotatably connected components.

In an example embodiment, stator 108 includes plate 130 non-rotatably connected to flange 116 and arranged to restrict movement of body portion 114 in axial direction AD2, opposite axial direction AD1. Plate 130 includes radially outermost portion 130A and in a stator freewheel mode (further discussed below), clutch 122 is open so that body portion 114 is rotatable with respect to flange 116, force F2 urges body portion 114 in direction AD2, and radially outermost portion 130A is in contact with body portion 114, for example, surface 131. Plate 130 can be connected to flange 116 by any means known in the art. In an example embodiment, flange 116 is formed from one piece of material and plate 130 is formed from another piece of material, different from piece of material for flange 116. In an example embodiment (not shown), flange 116 and plate 130 are formed of the same single piece of material.

The following provides further detail regarding torque converter 100. Stator 108 includes blades 132 axially disposed between impeller 104 and turbine 106. Torque converter 100 includes lock-up clutch 133. In an example embodiment, clutch 133 includes piston 134 axially displaceable to clamp friction material 136 against cover 102 to non-rotatably connect cover 102 and piston 134. In an example embodiment, torque converter 100 includes torsional vibration damper 138 with drive plate 140 non-rotatably connected to piston 134 and output flange 142 arranged to non-rotatably engage an input shaft (not shown) for a transmission. In an example embodiment, damper 138 includes cover plate 144, at least one spring 146 engaged with drive plate 140 and cover plate 144, and at least one spring 148 engaged with cover plate 140 and output flange 142.

The following describes an example operation of torque converter 100. In stator locked mode, impeller 104 rotates faster than turbine 106, torque converter 100 provides torque multiplication, and thrust force F2, generated by fluid FL circulating through the impeller and the turbine and passing through and pressing blades 132 in direction AD1, urges body portion 114 in direction AD1. The displacement of body portion 114 engages surfaces 118 and 120 to close clutch 122. Note that the circulation of fluid FL also generates force F1.

As a vehicle with torque converter 100 accelerates, the speed ratio between impeller 104 and turbine 106 decreases, and forces F1 and F2 also decrease. As the speed ratio approaches the coupling point, at which the speed of the turbine is only slightly less than the speed of the impeller: fluid FL passes through and presses blades 132 in direction AD2 generating force F3 in direction AD2; body portion 114 is displaced in direction AD2; clutch 122 opens, and body portion 114 is free to rotate with respect to flange 116. Force F3 is transmitted through thrust bearing 154. As torque converter 100 reaches the coupling point, clutch 122 is opened to initiate stator freewheel mode in which torque from cover 102 is transmitted to output flange 142, via clutch 133, by-passing turbine 106.

In an example embodiment, frusto-conical surfaces 118 and 120 come into direct contact with each other to close clutch 122, that is, there is no separate friction material between surfaces 118 and 120. The absence of friction material advantageously reduces the axial extent of torque converter 100. Radial line RL is orthogonal to axis of rotation AR (FIG. 2) for torque converter 100 and passes through frusto-conical surfaces 118 and 120, thereby forming acute angles α with respect frusto-conical surfaces 118 and 120.

Angle α is the cone angle of clutch 122. The transmittable torque across clutch 122 can be tuned by modifying cone angle α. The cone clutch has a transmittable torque described in Equation 1, which states:

$$T = \frac{1}{2} \cdot D \cdot \frac{F_{ax}}{\tan\left(\frac{\alpha}{2} + \rho\right)} \qquad \text{Equation 1}$$

where ρ is contact pressure in units of N/mm$^2$; $F_{ax}$ is the axial force or stator thrust in Newtons (N); D is the average cone diameter in mm; T is the transmittable torque in Newton meters (Nm); α is the cone angle in degrees; and, ρ is the friction angle in degrees with ρ=arctan μ. With an axial force of 4000 N in stall, an exemplary embodiment of cone clutch 122 that has the values D=102 mm, μ=0.1, α=33.25° has a transmittable torque of 496 Nm. This transmittable torque value is sufficient to cover the stall stator torque. However, angle α should not become too small, otherwise the clutch will not disengage.

As shown in FIG. 4, flange 116 is radially concentric to stator body portion 114 about axis of rotation AR. Circumferential surface 150 of stator 114 abuts and circumscribes circumferential surface 152 of flange 116. Axial flange 153 radially centers bearing 110.

Surface 162 of flange 116 is substantially parallel to surface 120 and creates an inner frusto-conical raceway. A recess is formed within flange 116 with circumferential surface 164, radial surface 166, and surface 162 defining the shape of the recess. The recess enables bearing 110 to fit within the axial package of flange 116, as well as enabling flange 116 and body portion 114 to extend radially into the space between impeller 104 and turbine 106. The extra radial extent enables a larger array of possible angles α.

Figure 7:
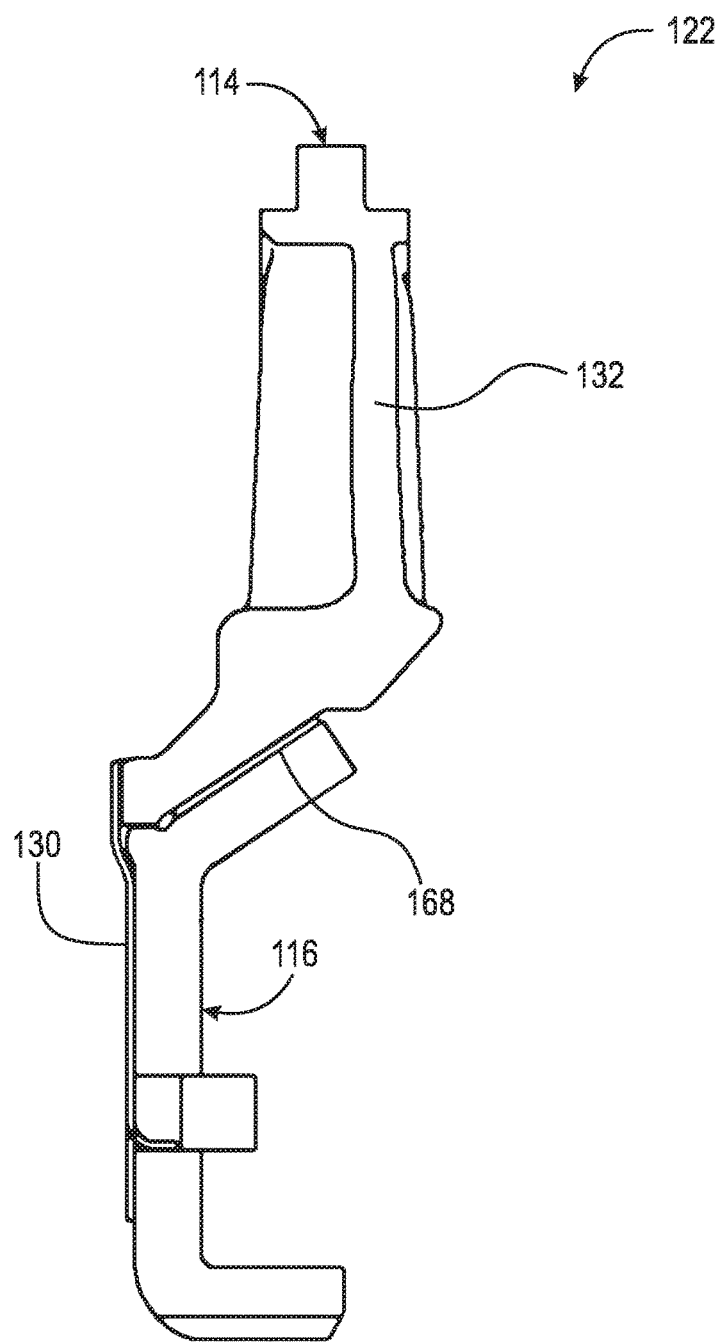
FIG. 7 is a partial cross-sectional view of the stator cone clutch of FIG. 2 including friction material.

FIG. 7 is a partial cross-sectional view of stator cone clutch 122 of FIG. 2 including friction material 168. In an example embodiment, clutch 122 includes friction material 168 disposed between body portion 114 and flange 116 and fixed to one of portion 114 or flange 116. In the stator locked mode, body portion 114, friction material 168, and flange 116 are non-rotatably connected. Friction material 168 can be any material known in the art. In an example embodiment, friction material 168 is wet friction paper bonded to an aluminum portion 114. Friction material 168 enables a controllable friction coefficient and prevents wear in contact surfaces 118 and 120.

Figure 8:
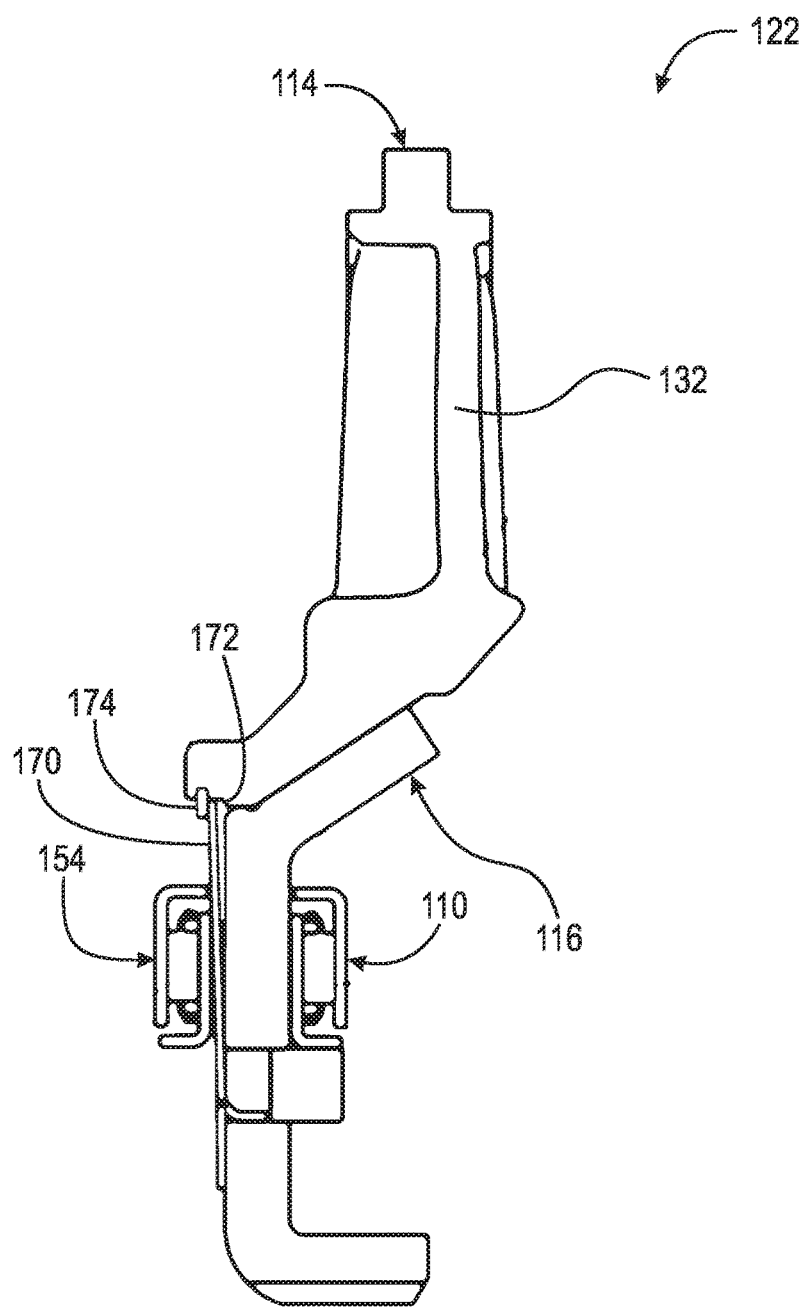
FIG. 8 is a partial cross-sectional view of the stator cone clutch of FIG. 2 including a diaphragm spring.

FIG. 8 is a partial cross-sectional view of stator cone clutch 122 of FIG. 2 including diaphragm spring 170. Spring 170 is fixed to flange 116 and urges portion 114 in direction AD2. Ideally, in freewheel mode, stator 108 experiences as little drag torque (between surfaces 118 and 120) as possible. Advantageously, spring 170 urges surfaces 118 and 120 apart from each other in freewheel mode, eliminating or minimizing the drag torque. Spring 170 is axially sandwiched between bearing 154 and flange 116. For the stator locked mode, thrust from bearing 154 pushes diaphragm spring 170 against shoulder 172 in flange 118, adding to force F1 to ensure proper engagement of clutch 108. In an example embodiment, in the freewheel mode, diaphragm spring 170 displaces portion 114 away from flange 116 in direction AD2 by pulling on snap ring 174 fixed to portion 114. Displacing portion 114 in direction AD2 increases a gap between surfaces 118 and 120, reducing drag during freewheel mode.

Figure 9:
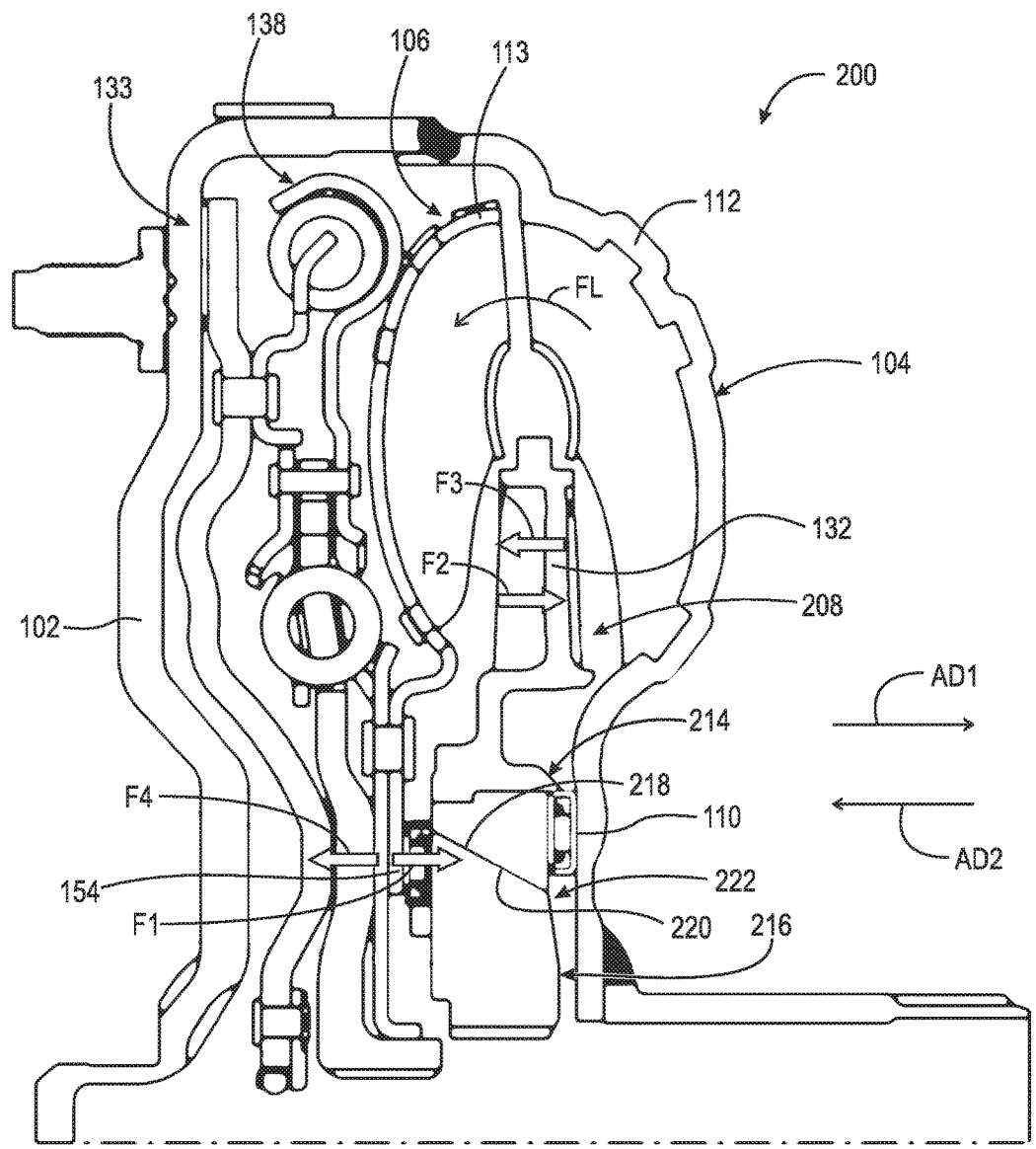
FIG. 9 is a partial cross-sectional view of a torque converter including a stator with a stator cone clutch including an activated flange.

FIG. 9 is a partial cross-sectional view of torque converter 200 including stator 208 with stator cone clutch 222 including activated flange 216. The discussion for torque converter 100 is applicable to torque converter 200 except as noted. Clutch 222 includes portion 214 and flange 216 with frusto-conical surfaces 218 and 220, respectively. However, in contrast to surfaces 118 and 120, surfaces 218 and 220 are sloped radially outward in axial direction AD2 (the opposite of the orientation of surfaces 118 and 120). Bearing 154 is directly engaged with flange 216. For the stator locked mode: force F1 urges flange 216 in direction AD1, non-rotatably connecting surfaces 218 and 220; and bearing 110 transmits force F1 to impeller shell 112. For the freewheel mode, the circulation of fluid FL generates force F4 on the turbine shell, enabling surface 218 to disengage from surface 220.

Figure 10:
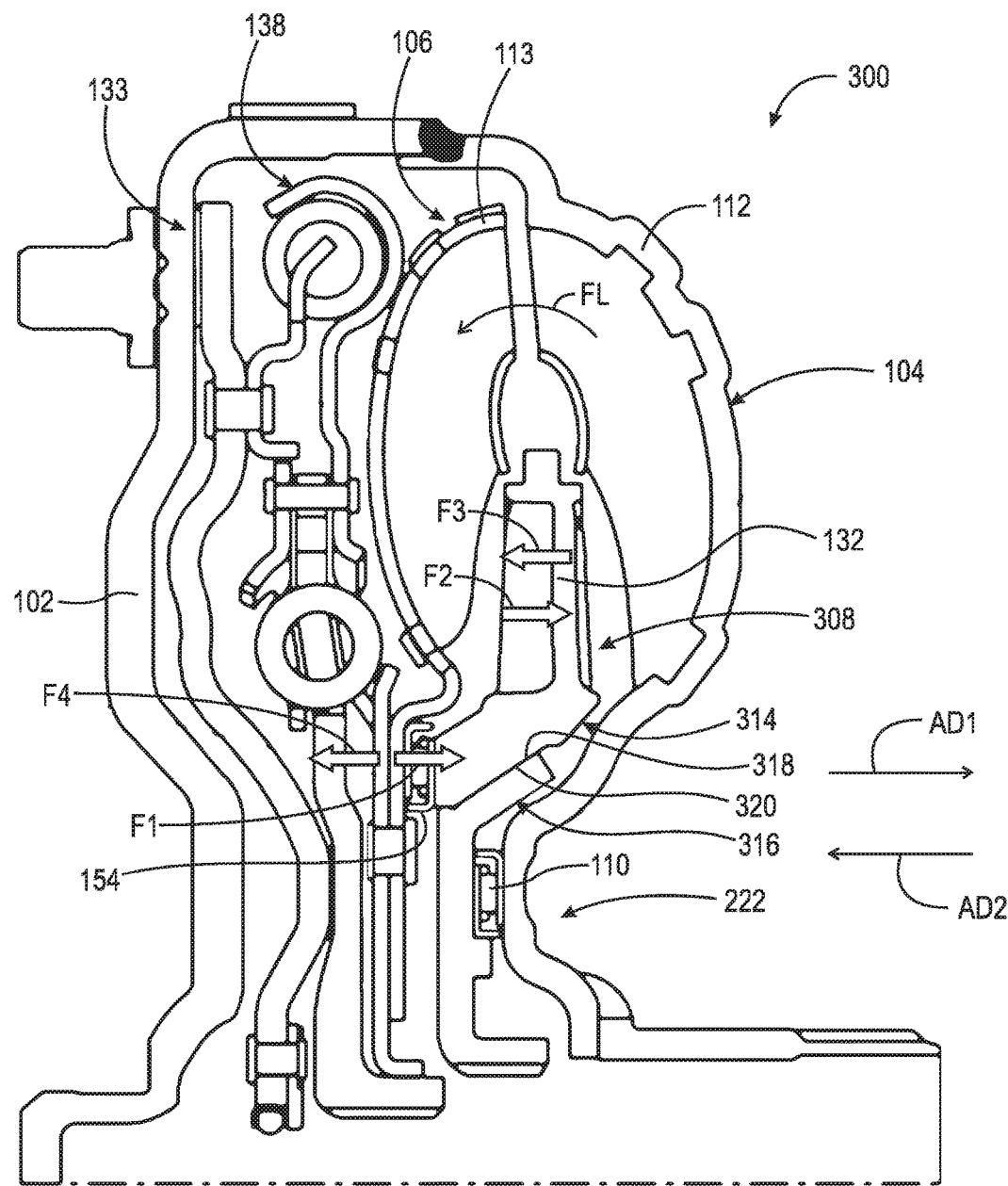
FIG. 10 is a partial cross-sectional view of a torque converter including a stator with a stator cone clutch including an activated body portion.

FIG. 10 is a partial cross-sectional view of torque converter 300 including stator 308 with stator cone 322 clutch including activated body portion 314. The discussion for torque converter 100 is applicable to torque converter 300 except as noted. Clutch 322 includes body portion 314 and flange 316 including frusto-conical surfaces 318 and 320, respectively. For the stator locked mode: forces F1 and F2 urge body portion 316 in direction AD1, non-rotatably connecting surfaces 318 and 320; and bearing 110 transmits forces F1 and F2 to impeller shell 112. For the freewheel mode, the circulation of fluid FL generates forces F3 and F4, enabling surface 318 to disengage from surface 320. Thus, clutch 322 advantageously adds force F2 to force F1 to increase the torque capacity of clutch 322.

Figure 11:
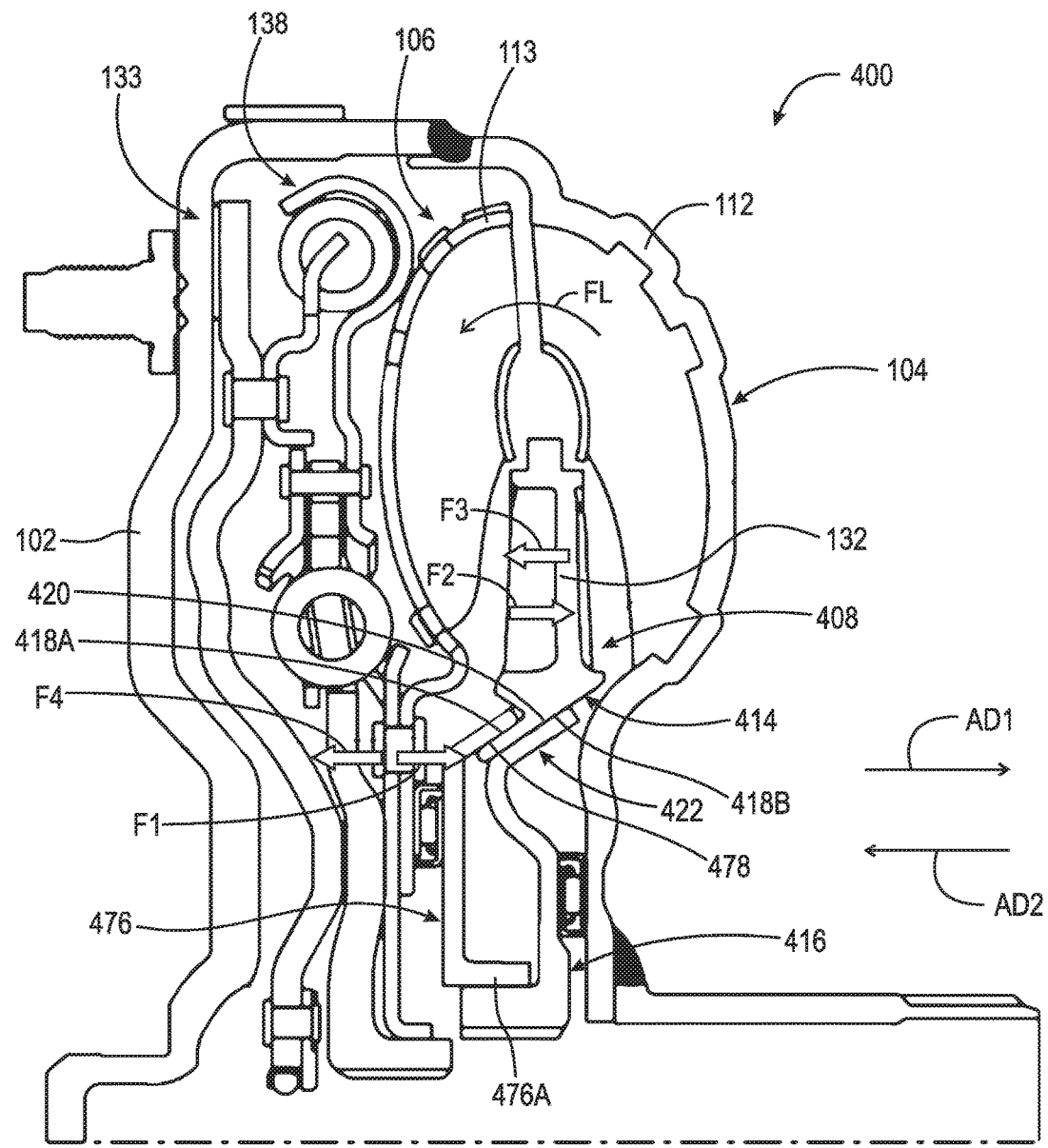
FIG. 11 is a partial cross-sectional view of a torque converter including a stator with a stator cone clutch including a clutch plate and a body portion with two frusto-conical surfaces; and, FIG. 12 is a partial cross-sectional view of a torque converter including a stator with a stator cone clutch including a clutch plate and a body portion with two frusto-conical surfaces.

FIG. 11 is a partial cross-sectional view of torque converter 400 including stator 408 with stator cone clutch 422 including clutch plate 476 and body portion 414 with two frusto-conical surfaces. The discussion for torque converter 100 is applicable to torque converter 400 except as noted. Portion 414 includes frusto-conical surfaces 418A and 418B. Plate 476 includes frusto-conical surface 478. Flange 416 includes frusto-conical surface 420. Bearing 154 is directly engaged with turbine shell 113 and plate 476. Radially innermost distal end 476A of plate 476 is non-rotatably connected to flange 416. In an example embodiment, plate 476 is axially displaceable with respect to flange 416.

For the stator locked mode: force F1 urges plate 476 in direction AD1, non-rotatably connecting surfaces 478 and 418A; force F2 urges portion 414 in direction AD1, non-rotatably connecting surfaces 418B and 420; and bearing 110 transmits forces F1 and F2 to impeller shell 112. For the freewheel mode: force F4 enables surface 478 to disengage from surface 418A; and force F3 displaces portion 414 in direction AD2 to disengage surfaces 418B and 420. Thus, clutch 422 advantageously adds force F2 to force F1 to increase the torque capacity of clutch 422. In an example embodiment, surfaces 478, 418A, 418B, and 420 are parallel.

Figure 12:
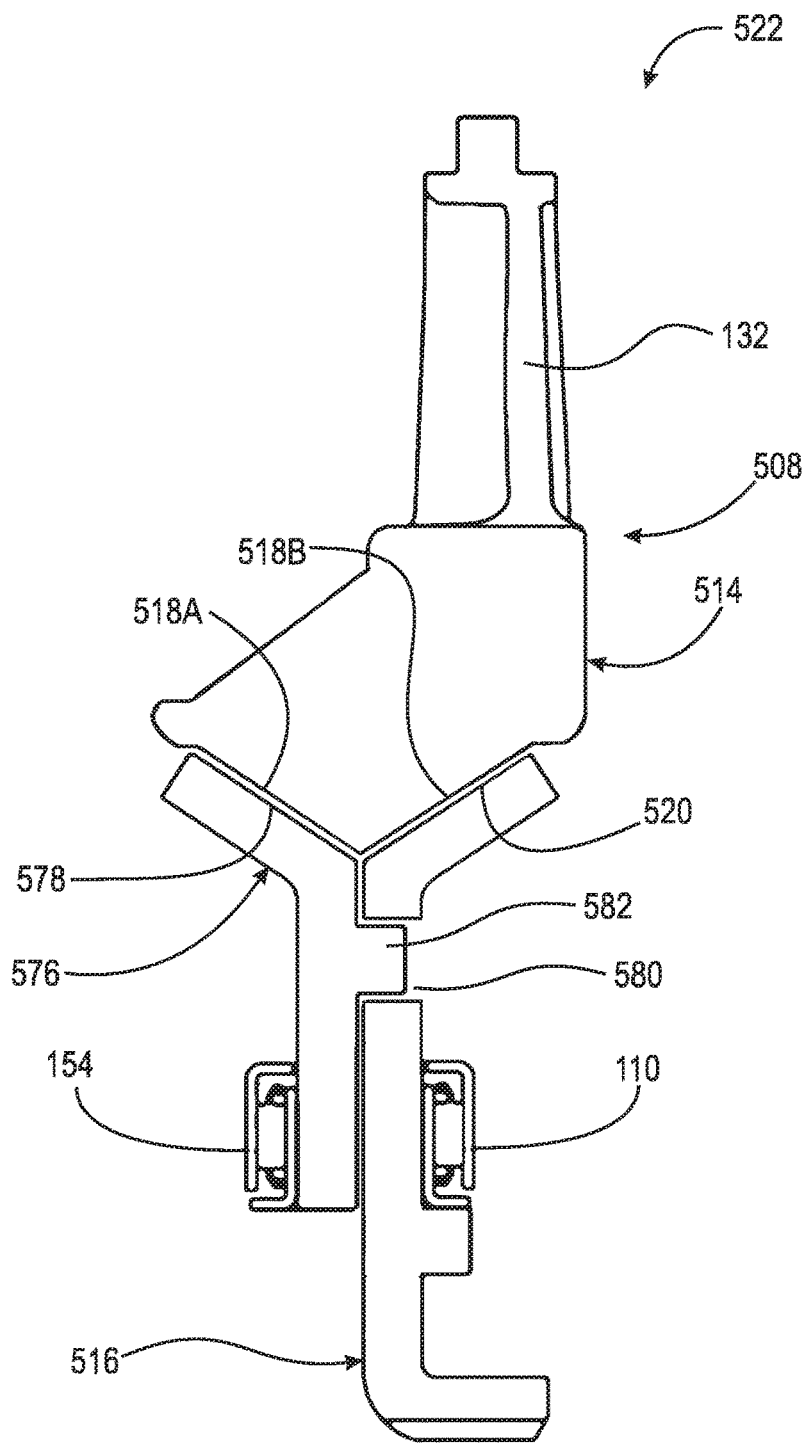

FIG. 12 is a partial cross-sectional view of stator cone clutch 522 including clutch plate 576 and body portion 516 with two frusto-conical surfaces. Portion 516 includes frusto-conical surfaces 518A and 518B. Plate 576 includes frusto-conical surface 578. Flange 516 includes frusto-conical 520. Bearing 154 is directly engaged with turbine shell 113 and plate 576. In an example embodiment: surfaces 578 and 518A are parallel; surfaces 518B, and 520 are parallel; and surfaces 518A and 518B are not parallel. One of clutch plate 575 or flange 516 includes at least one slot and the other of clutch plate 576 or flange 516 includes at least one protrusion disposed in the at least one slot. The at least one slot and the at least one protrusion non-rotatably connect clutch plate 476 and flange 516. In an example embodiment, flange 516 includes at least one slot 580 and plate 576 includes at least one protrusion 582 disposed in at least one slot 580.

For the stator locked mode: force F1 urges plate 576 in direction AD1, non-rotatably connecting surfaces 578 and 518A; force F2 urges portion 514 in direction AD1, non-rotatably connecting surfaces 518B and 520; and bearing 110 transmit forces F1 and F2 to impeller shell 112. For the freewheel mode: force F4 enables surface 578 to disengage from surface 518A; and force F3 displaces portion 514 in direction AD2 to disengage surfaces 518B and 520. Thus, clutch 522 advantageously adds force F2 to force F1 to increase the torque capacity of clutch 522.

Figure 13:
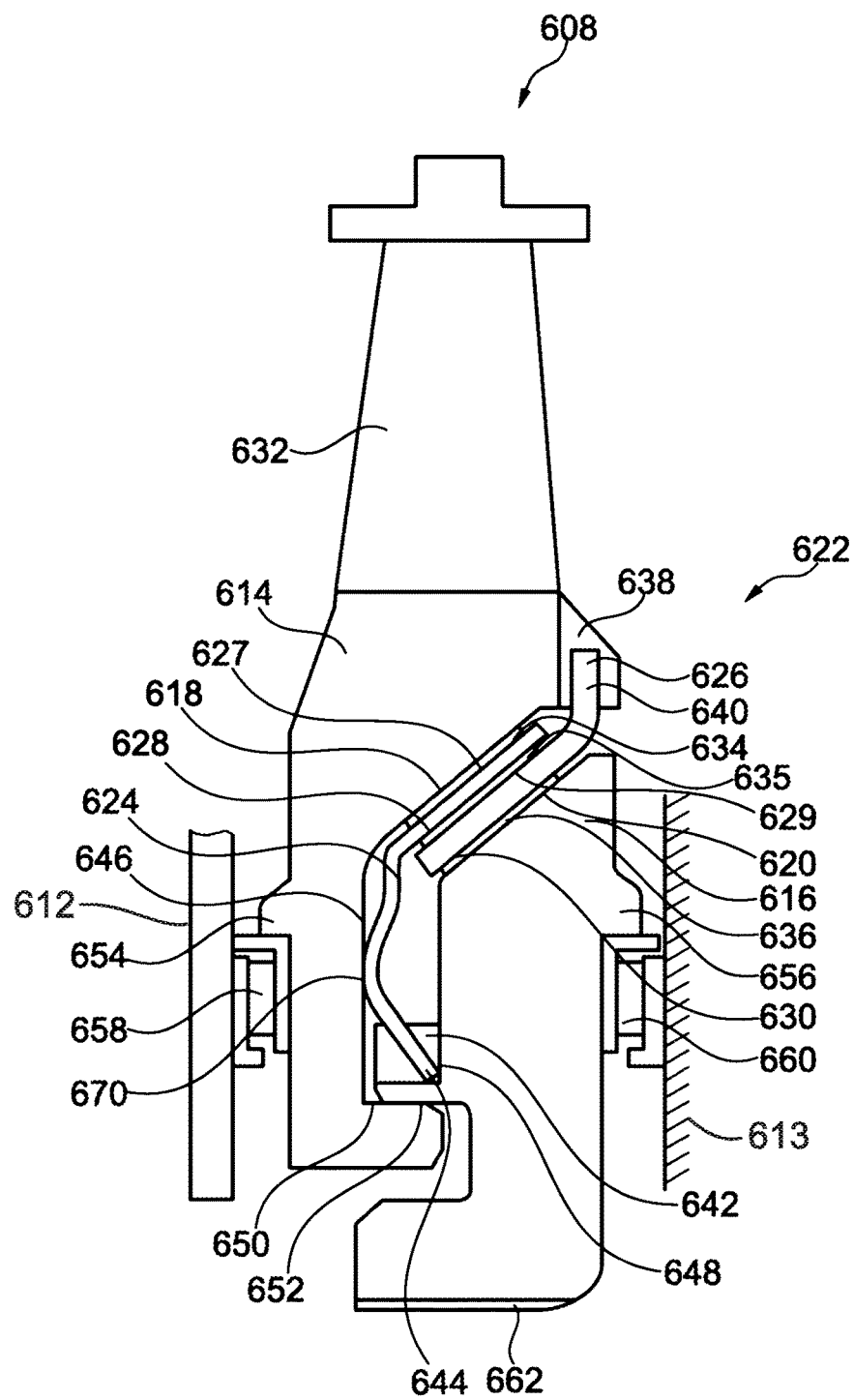
FIG. 13 is a partial cross-sectional view of a stator with a multi-plate stator cone clutch.

The following description is made with reference to FIG. 13. FIG. 13 is a partial cross-sectional view of a stator with a multi-plate cone clutch. Stator 608, turbine 612 and impeller shell 613 are for a torque converter such as torque converter 100 in FIG. 1. Stator 608 includes body portion with frusto-conical surface 618, flange 616 with frusto-conical surface 620 and stator clutch 622. Clutch 622 includes surfaces 618 and 620, and clutch plates 624 and 626 disposed therebetween. Clutch plates 624 and 626 include respective pairs of frusto-conical surfaces 627 and 628, and 629 and 630. Plate 624 includes friction material rings 634 and 635 bonded to surfaces 627 and 628, respectively. Plate 626 includes friction material ring 636 bonded to surface 630. Although two rings are shown bonded to plate 624 and one to 626, other configurations of friction material rings are possible. For example, plate 626 may include two rings and plate 624 only one. Or surfaces 618 and 620 may have bonded friction material rings and only one of plates 624 and 626 may have a single ring.

Body portion 614 includes drive tab 638 and plate 626 includes tab 640, drivingly engaged with tab 638. By drivingly engaged we mean that portion 614 and plate 626 are fixed rotationally, but may move relative to one another axially. Clutch plate 626 extends radially outward past surface 618, for example, tab 640 is radially outward of surface 618. Flange 616 includes drive tab 642 and plate 624 includes drive tab 644, drivingly engaged with tab 642. Body portion 614 includes radial wall 646 and plate 624 includes integral spring portion 670 contacting wall 646. Portion 670 is arranged to open clutch 622 when not operated on by external forces. That is, spring 670 separates the body portion, flange, and clutch plates when the clutch is unlocked. Although spring 670 is shown integrally formed from a same piece of material as clutch plate 624, other configurations are possible. For example, spring 670 may be separate from clutch plate 624 and formed from a separate piece of material. Flange 616 includes radial wall 648 and tab 644 contacts wall 648 to oppose a force from spring portion 670 to open clutch 622.

Body portion 614 and flange 616 include respective circumferential surfaces 650 and 652 in contact with one another. Surfaces 650 and 652 aid in radial positioning of portion 614 and flange 616 relative to one another. Body portion 614 includes protrusion 654 and flange 616 includes protrusion 656 for radially positioning bearings 658 and 660, respectively. Flange 616 includes spline portion 662 for driving engagement with a transmission stator shaft (not shown). Body portion 614 includes stator blade 632.

In an exemplary embodiment, clutches 122 through 622 can be used for torque converters that include a turbine clutch (a lock-up clutch) non-rotatably connecting respective radially outer portions of shells 112 and 113. In this case, bearing 154 is removed and plate 130 is attached to flange 116 by other means.

Advantageously, stators 108 through 608 address the problems noted above regarding operation of prior art stators with cone clutches. In particular, thrust bearing 110 eliminates the transfer of thrust forces to the transmission. Specifically, thrust forces F1 and F2, generated during stator locked mode, are transmitted from blades 132, the body portion, or the flange to impeller shell 112 via thrust bearing 110. Thus, the forces generated by operation of torque converter 100 are equalized within the framework of torque converter 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A stator for a torque converter comprising:
   a body portion including a first frusto-conical surface;
   a flange including a second frusto-conical surface; and,
   a stator clutch including the first and second frusto-conical surfaces and at least one clutch plate disposed therebetween, wherein the at least one clutch plate comprises a pair of frusto-conical surfaces.

2. The stator of claim 1 wherein at least one of the at least one clutch plate frusto-conical surfaces includes a friction material bonded thereto.

3. The stator of claim 1 wherein the body portion or the flange includes a first drive tab and the at least one clutch plate includes a second drive tab drivingly engaged with the first drive tab.

4. The stator of claim 1 wherein:
   the at least one clutch plate comprises two clutch plates;
   the body portion and the flange each comprises respective drive tabs;
   one of the clutch plates includes a first drive tab drivingly engaged with the body portion drive tab; and,
   the other of the clutch plates includes a second drive tab drivingly engaged with the flange drive tab.

5. The stator of claim 4 wherein the body portion comprises a radial wall and the other of the clutch plates includes an integral spring portion contacting the body portion radial wall.

6. The stator of claim 5 wherein the flange comprises a radial wall and the second drive tab is in contact with the flange radial wall.

7. The stator of claim 1 wherein the body portion and the flange comprise respective circumferential surfaces in contact with one another.

8. The stator of claim 1 wherein the body portion or the flange comprises a circumferential protrusion for radially positioning a bearing.

9. The stator of claim 1 further comprising a bearing.

10. The stator of claim 1 wherein the flange comprises a spline for driving engagement with a transmission stator shaft.

11. The stator of claim 1 wherein the body portion comprises at least one stator blade.

12. A torque converter, comprising:
    a cover arranged to receive torque;
    an impeller including an impeller shell non-rotatably connected to the cover;
    a turbine:
      in fluid communication with the impeller; and,
      including a turbine shell;
    a stator:
      at least partially located between the impeller and the turbine; and,
      including a body portion with at least one stator blade and a first frusto-conical surface;
    a stator cone clutch including:
      the first frusto-conical surface;
      a flange including a second frusto-conical surface; and,
      at least one clutch plate disposed between the first and second frusto-conical surfaces; and,
    a first thrust bearing axially disposed between the stator cone clutch and the impeller shell, wherein in a stator locked mode:
      the body portion, the clutch plate, and the flange are non-rotatably connected; and,
      the stator cone clutch is arranged to urge the first thrust bearing against the impeller shell in a first axial direction.

13. The torque converter of claim 12, wherein a line, orthogonal to an axis of rotation for the torque converter, passes through the first and second frusto-conical surfaces and forms respective acute angles with respect to the first and second frusto-conical surfaces.

14. The torque converter of claim 12, wherein:
    in the stator locked mode, fluid circulating through the impeller and the turbine is arranged to generate a first force urging the body portion in the first axial direction to non-rotatably connect the body portion and the flange; and,
    in a stator free-wheel mode, the fluid circulating through the impeller and the turbine is arranged to generate a second force, in a second axial direction opposite the first axial direction, urging the body portion in the second axial direction to enable rotation between the body portion and the flange.

15. The torque converter of claim 12, further comprising:
    friction material disposed between the body portion and the flange and fixed to one of the body portion, the at least one clutch plate, or the flange, wherein in the stator locked mode, the body portion, the friction material, and the flange are non-rotatably connected.

16. The torque converter of claim 12, further comprising:
    a second thrust bearing located between the turbine shell and the stator cone clutch in the first axial direction, wherein for the stator locked mode, the second thrust bearing is arranged to transmit thrust from the turbine shell to the stator cone clutch to non-rotatably connect the body portion and the flange.

17. The torque converter of claim 16, wherein:
    the first thrust bearing:
      is directly engaged with the flange; and,
      in the stator locked mode, is arranged to transmit the thrust from the turbine shell to the impeller shell; and,
    the second thrust bearing is directly engaged with the body portion.

18. The torque converter of claim 16, wherein:
    the second thrust bearing:

is directly engaged with the body portion; and,
in the stator locked mode, is arranged to transmit the thrust from the turbine shell to the body portion to displace the body portion in the first axial direction; and, the first thrust bearing is directly engaged with the flange.

19. The torque converter of claim 12, wherein:

the at least one clutch plate comprises two clutch plates;

one of the clutch plates includes a radially outer-most distal end non-rotatably connected to the body portion; and, the other of the clutch plates includes a radially inner-most distal end non-rotatably connected to the flange.

* * * * *